United States Patent [19]
Page

[11] Patent Number: 6,014,855
[45] Date of Patent: Jan. 18, 2000

[54] LIGHT HYDROCARBON FUEL COOLING SYSTEM FOR GAS TURBINE

[75] Inventor: Vince Page, Katy, Tex.

[73] Assignee: Stewart & Stevenson Services, Inc., Houston, Tex.

[21] Appl. No.: 08/846,940

[22] Filed: Apr. 30, 1997

[51] Int. Cl.⁷ .................................................. F02C 7/22
[52] U.S. Cl. .............................. 60/39.06; 60/730; 60/734
[58] Field of Search .............................. 60/37.02, 39.06, 60/39.12, 39.465, 734, 267, 730

[56] References Cited

U.S. PATENT DOCUMENTS

| 2,718,753 | 9/1955 | Bridgeman ............................. 60/39.465 |
| 3,918,255 | 11/1975 | Holden . |
| 3,996,023 | 12/1976 | Osmond et al. . |
| 4,086,757 | 5/1978 | Karstensen et al. . |
| 4,120,150 | 10/1978 | Wakeman . |
| 4,148,185 | 4/1979 | Somers . |
| 4,190,398 | 2/1980 | Corsmeier et al. . |
| 4,218,194 | 8/1980 | Reber et al. . |
| 4,235,855 | 11/1980 | Cleveland . |
| 4,256,172 | 3/1981 | Rahnke et al. . |
| 4,283,234 | 8/1981 | Fukui et al. . |
| 4,289,446 | 9/1981 | Wallace . |
| 4,424,667 | 1/1984 | Fanning . |
| 4,705,761 | 11/1987 | Kosugi . |
| 4,825,640 | 5/1989 | Shekleton . |
| 4,872,312 | 10/1989 | Iizuka et al. . |
| 5,001,896 | 3/1991 | Hilt et al. . |
| 5,105,625 | 4/1992 | Bell, III et al. . |
| 5,165,224 | 11/1992 | Spadaccini et al. ................... 60/39.02 |
| 5,233,823 | 8/1993 | Day . |
| 5,255,504 | 10/1993 | Hodrien et al. ......................... 60/39.12 |
| 5,261,226 | 11/1993 | Pillsbury . |
| 5,279,111 | 1/1994 | Bell et al. . |
| 5,321,944 | 6/1994 | Bronicki et al. . |
| 5,321,951 | 6/1994 | Falls et al. . |
| 5,386,685 | 2/1995 | Frutschi . |
| 5,442,904 | 8/1995 | Shnaid . |
| 5,535,584 | 7/1996 | Janes . |
| 5,581,996 | 12/1996 | Koch et al. . |

Primary Examiner—Louis J. Casaregola
Attorney, Agent, or Firm—Sue Z. Shaper; Butler & Binion, L.L.P.

[57] ABSTRACT

The subject invention provides a gas turbine engine in which a cooling system is utilized to lower the temperature of light hydrocarbon liquid fuel before the fuel is injected into the combustors. Specifically, the fuel cooling system is deployed in the fuel delivery system upstream of the combustors to lower the temperature of the liquid fuel below the flash point temperature, preventing phase change and premature combustion. In the preferred embodiment, the cooling system is a closed loop system comprising a heat exchanger, a containment reservoir, and a refrigeration unit. Brine is circulated within the loop, such that cooled brine is passed into the heat exchanger to act as a heat sink for the light hydrocarbon flowing therethrough. Warm brine exiting the heat exchanger is directed into the refrigeration unit for cooling before being collected and stored in the containment reservoir. The cooled light hydrocarbon exits the heat exchanger and is injected into the gas turbine engine. In other embodiments, the fuel cooling system may be either open or closed loop and may comprise other types of heat exchangers, such as water cooled or gas cooled heat exchangers.

17 Claims, 2 Drawing Sheets

LIGHT HYDROCARBON FUEL COOLING SYSTEM FOR GAS TURBINE

BACKGROUND OF THE INVENTION

1. Field of the Invention

The present invention relates to gas turbine engines that employ light hydrocarbons as fuel, and more particularly, to an apparatus and method for preventing premature combustion of light hydrocarbons introduced into the gas turbine engines.

2. Description of the Prior Art

A large gas turbine engine generally includes a compressor, a combustion section, and a turbine. An annular flow path for a working fluid extends axially through these sections of the engine. Gas turbine engines produce power through the controlled heating of a compressed working fluid. In an open loop system, the working fluid, typically air, is drawn into the compressor where the air is compressed. The compressed air is then introduced into the combustion section, usually comprised of one or a number of combustion chambers or combustors, where heat is applied to the compressed air. Specifically, the air is mixed with a combustible fuel and burned to produce hot, pressurized gas. The hot combustion gasses are then expanded through the turbine, wherein the hot gasses are directed across blades mounted on a turbine wheel. This flow of hot combustion gasses acts to rotate the turbine wheel. The rotating turbine, which is connected to a gas turbine compressor by means of a drive shaft, provides power for the process compressor. In addition, the turbine may also be used to provide power for other mechanisms, such as generators, pumps or marine propellers. Furthermore, the expulsion of hot gasses through the turbine exhaust nozzle can be used to generate a propulsion force as is typical in jet aircraft engines.

Common construction in combustion chambers includes a metal liner within a cylindrical casing. Air is forced over the surface of the liner, through holes in the liner, and into the interior of the combustion chamber. The combustion chamber is injected with atomized fuel by a nozzle or burner. The initial ignition of the fuel takes place through the firing of a spark plug. Specifically, during startup, the shaft of the gas turbine engine is cranked to starting speed by an external energy source, such as a diesel or electric motor. Once starting speed is attained, fuel and air are introduced into the combustion chamber. A spark plug is then fired to ignite the burner, starting the combustion reaction. Once begun, the combustion reaction is continuous, fed by the continuous injection of fuel into the chamber.

Combustors are now being developed for temperatures of almost 4000° F. The combustor inlet temperature may be anywhere from 250° F. to 2500° F. Due to these temperatures, combustors must be designed to avoid steep temperature gradients within their interiors which would cause warping and cracking of the liners, burners and other metal components within the combustor. Carbon deposits resulting from poorly combusted fuel may also cause local hot spots and distortion of the liner. During start-up, the turbine engine must be brought up to design specifications under highly controlled conditions. For this reason, the start-up and lower power combustion reaction within the combustors is generally carried out under conditions that permit the surfaces within the turbine engine to warm up gradually as the intensity of the combustion reaction is increased.

Generally, combustion in gas turbines is fed by either gaseous or liquid fuels. Turbine engines that are stationary, such as those used in industrial applications, are most commonly fueled by natural gas, if available. In contrast, turbine engines that are mobile, such as those used to propel jet aircraft or drive ships, are more likely to be fueled by liquid hydrocarbons, for example gasoline, diesel fuel, or aviation fuel. In instances when natural gas is not available or practical, stationary gas turbine engines may also use liquid hydrocarbons. Typically, these liquid hydrocarbons are characterized by a specific gravity of at least approximately 0.72. For the purposes of this invention, liquid hydrocarbons having these characteristics are referred to as "heavy hydrocarbons" while liquid hydrocarbons with specific gravities below approximately 0.72 will be referred to as "light hydrocarbons."

Natural gas is desirable as a fuel because of its comparatively low cost relative to the heavy hydrocarbons. However, turbine engines that utilize natural gas must be in locations that have access to a continuous source of natural gas or locations that are fed by natural gas pipelines. Even if a source of natural gas is available, the difficulties of installing and maintaining natural gas pipelines may be prohibitive, especially in remote locations or underdeveloped areas or countries. On the other hand, one drawback to heavy hydrocarbons is their expense and scarcity, especially at times and in locations of high demand such as for automobiles and aircraft.

One solution to the problems associated with heavy hydrocarbons is to employ light hydrocarbons, such as naphtha or butane. Commonly, light hydrocarbons such as these are generated as waste products from refinery processes, and therefore, are readily available at a low cost. These waste products are typically disposed of by flaring into the atmosphere. As gas turbine fuels, these light hydrocarbons are advantageous over heavy hydrocarbons because of their availability and low cost. However, because of their comparatively lower molecular weights and specific gravities, light hydrocarbons typically have lower phase change and flash point temperatures than heavy hydrocarbons. As such, light hydrocarbons are more susceptible to phase changes and more flammable than heavy hydrocarbons. With respect to gas turbine engines, these light hydrocarbons are more likely to prematurely combust within the combustion chamber due to their lower flash points, resulting in temperature gradients that could damage the gas turbine engine, such as, for example, the above-described damage that can occur during start-up procedures and low power conditions. Furthermore, phase changes can create vapor bubbles in the fuel lines that feed the combustor burners, creating interruptions in the continuous fuel flow and potentially causing damage to the turbine engines.

Several prior art methods and devices have been employed to protect the combustor from thermal stresses associated with sudden temperature gradients. For example, it is known in the prior art that the surfaces of the combustor can be coated with a ceramic material to protect against heat stress. Along these same lines, the combustor components can be formed of a high temperature alloys. These solutions, however, do nothing to prevent the light hydrocarbons fuels from prematurely igniting, but only address the problem after the fact. In addition, these solutions are comparatively expensive in relation to standard combustors. Furthermore, in the case of pre-existing gas turbine engines that have been converted to light hydrocarbon fuels, retrofitting turbines with these types of components, if possible, adds both additional expense and would generally require significant downtime.

Another solution to permit use of light hydrocarbons in gas turbine engines is to employ a less flammable fuel during the start-up procedure, i.e., the gas turbine engine is warming up, and under low power conditions. For example, a common practice is to utilize diesel fuel during warm up, and switch over to naphtha once a predetermined load and combustor pressure have been achieved. One drawback to such a configuration is the requirement of dual fuel systems. Specifically, an independent fuel delivery system is required for each type of fuel, even though the fuel delivery systems themselves are generally identical. Another drawback is the excessive use of a more expensive fuel.

SUMMARY OF THE INVENTION

The subject invention provides a gas turbine engine in which a cooling system is utilized to lower the temperature of light hydrocarbon liquid fuel before the fuel is injected into the combustors. Specifically, the cooling system is deployed in the fuel delivery system upstream of the combustors to lower the temperature of the liquid fuel below the flash point temperature, preventing phase change and premature combustion. In the preferred embodiment, the cooling system is a closed loop system comprising a heat exchanger, a containment reservoir, and a refrigeration unit. Brine is circulated within the loop, such that cooled brine is passed into the heat exchanger to act as a heat sink for the light hydrocarbon flowing therethrough. Warm brine exiting the heat exchanger is directed into the refrigeration unit for cooling before being collected and stored in the containment reservoir. The cooled light hydrocarbon exits the heat exchanger and is injected into the gas turbine engine.

The invention is advantageous over the prior art for several reasons. First, the invention permits use of light hydrocarbons with preexisting gas turbine engines without the need for costly modifications and down time. Specifically, the cooling system of the invention can be inserted between a fuel reservoir and a gas turbine engine without the need to modify the combustors within the gas turbine engine. The prior art devices only address the effects, i.e., sudden temperature gradients, of light hydrocarbon phase change and premature combustion on a gas turbine engine. The present invention, however, addresses the cause of light hydrocarbon phase change and premature combustion, namely a liquid hydrocarbon temperature at or near the flash point. By adjusting the temperature of the liquid hydrocarbons to be well below the fuel's flash point temperature, concerns regarding the effects of premature combustion are obviated and costly alterations to the combustors are avoided.

The invention also avoids the need for secondary fuel delivery systems in light hydrocarbon gas turbine engines. One solution in the prior art to light hydrocarbon phase change and premature combustion is to provide two fuel delivery systems that are essentially mechanically identical but for the type of fuel they handle. The first system typically delivers a heavy hydrocarbon fuel for start-up and low power turbine operating conditions, while the second system delivers a light hydrocarbon during normal and high power operating conditions. Such a dual fuel delivery system is costly and burdensome, especially since two types of hydrocarbon fuel must be on-hand for operation over the turbine's full operating range. The present invention eliminates the need for the first system, such that only a single fuel delivery system is needed to meet the turbine requirements over the full range of operation.

Finally, the present invention enables expanded use of light hydrocarbons as a fuel for gas turbine engines, rendering such engines more accessible by poorer and underdeveloped areas and countries. Heretofore, only heavy hydrocarbons, which are comparatively expensive and scarce, could be practically utilized in standard gas turbine engines. Light hydrocarbons could only be practically utilized if the engine had been designed or subsequently modified to withstand sudden temperature gradients. The expense of utilizing either heavy hydrocarbons or purchasing specially designed or modified equipment precluded use of such gas turbines by poorer and underdeveloped areas and countries. Because light hydrocarbons are typically waste products from refinery processes, light hydrocarbons are in abundant supply at a low cost, especially in relation to heavy hydrocarbon fuels. The present invention renders use of light hydrocarbons as a gas turbine engine fuel much more feasible. By lowering the cost of the fuel, while at the same time maintaining a low equipment cost, the overall costs associate with installing and operating gas turbine engines is reduced, rendering such engines more feasible for use in poorer countries and regions.

DETAILED DESCRIPTION OF THE PREFERRED EMBODIMENTS

Figure 1:
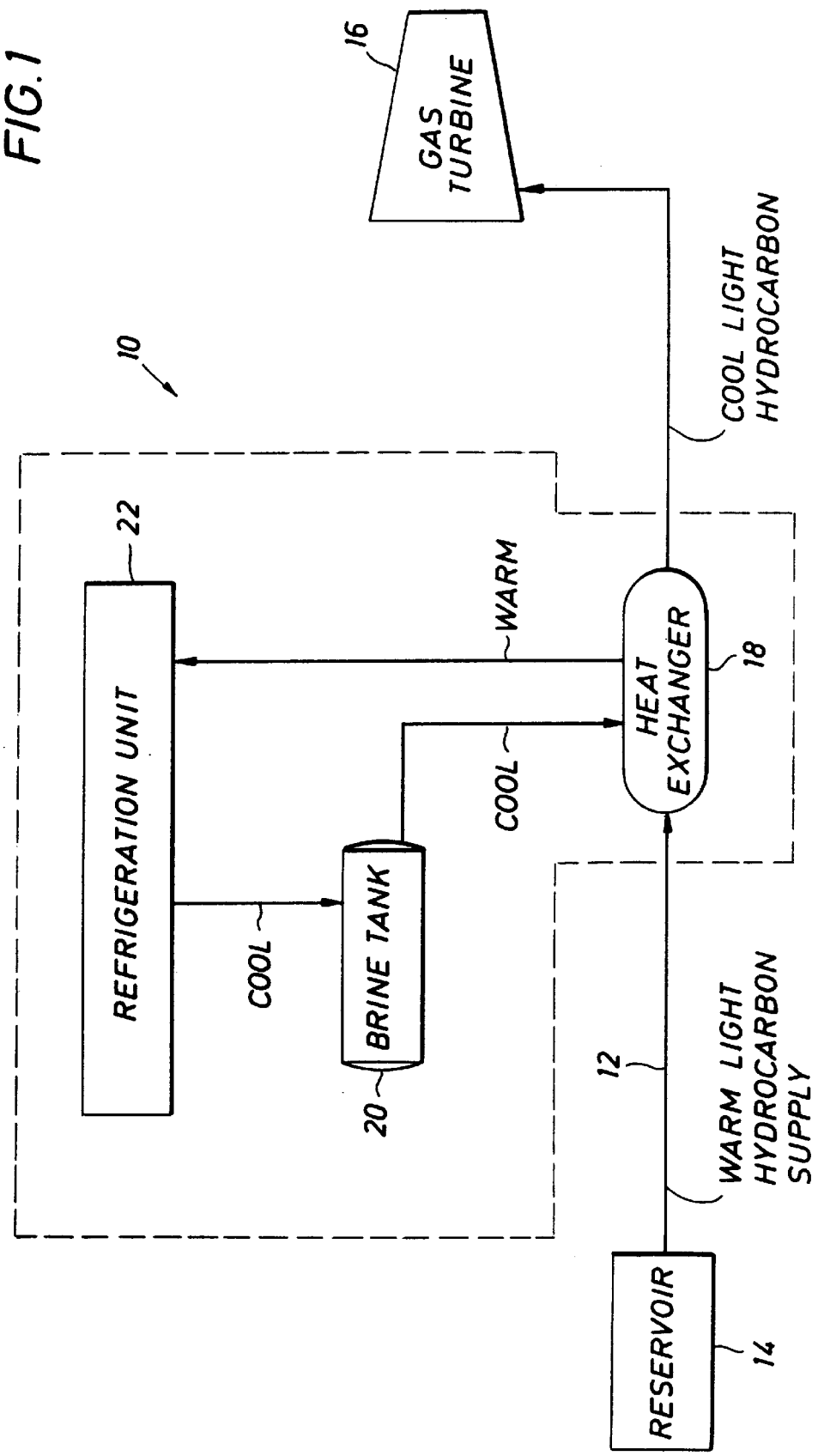
FIG. 1 illustrates a flow diagram for the current invention.
Figure 2:
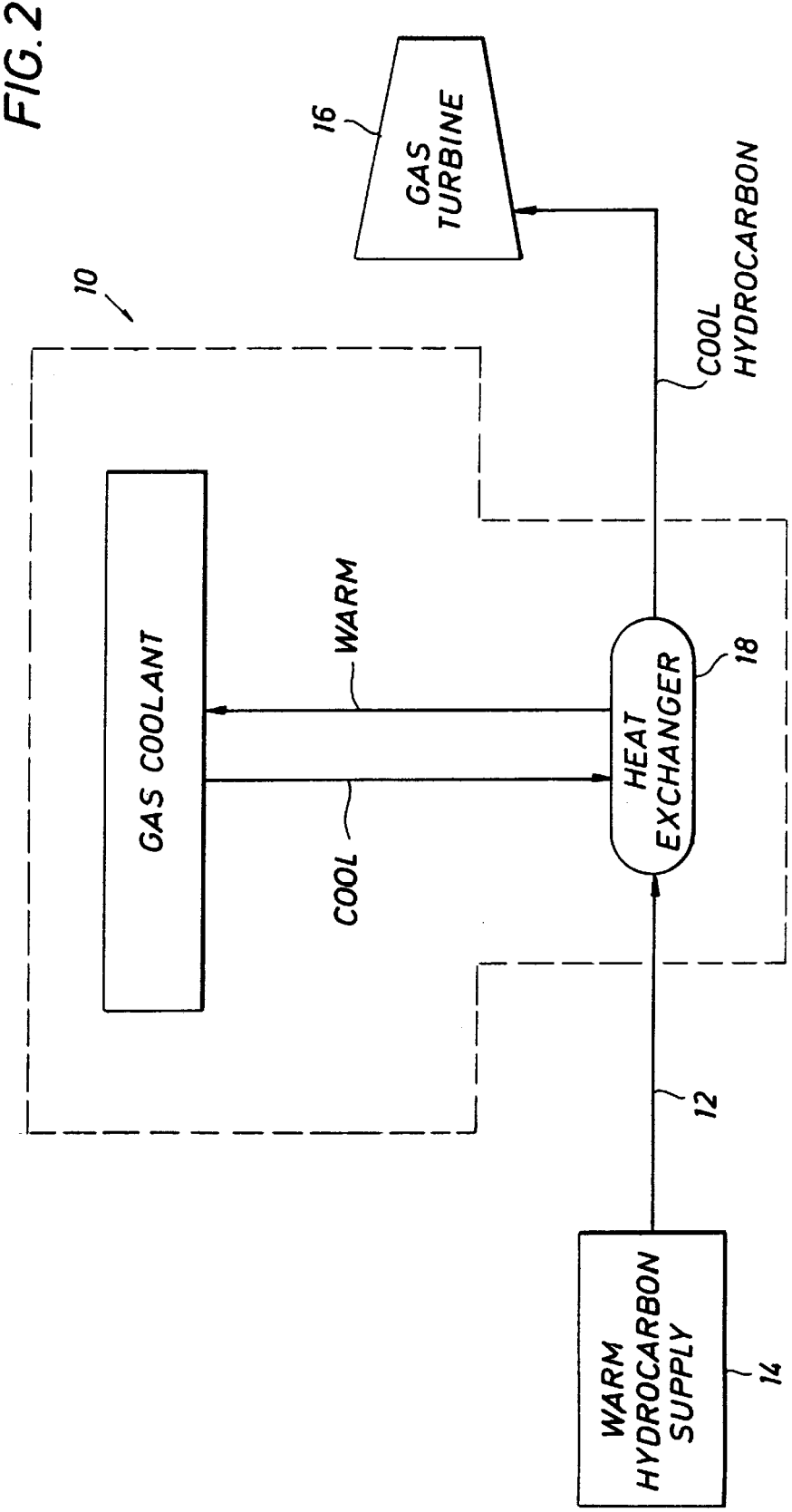
FIG. 2 illustrates a flow diagram for the current invention in which a gas is used to provide cooling of the fuel.

A method for insuring that certain liquid hydrocarbon fuels used in gas turbine engines do not change phase and prematurely combust comprises the steps of providing a hydrocarbon fuel having a certain flash point temperature $T_F$, passing the fuel through a cooling system to lower the temperature T of the fuel to a value well below flash point temperature $T_F$, and injecting the cooled fuel into a gas turbine engine. Although any type of cooling apparatus or device may be used to cool the liquid hydrocarbon fuel, one such cooling system is shown in FIG. 1 and generally designated as 10. Cooling system 10 is disposed in the fuel delivery line 12 between a fuel reservoir 14 and a gas turbine engine 16. Typically, reservoir 14 is a storage tank, although reservoir 14 may consist simply of a fuel pipeline when the fuel is pumped in from outside sources. Cooling system 10 comprises a heat exchanger 18, a cooling fluid containment reservoir 20 and a refrigeration unit 22, all in closed-loop fluid communication with one another. A cooling fluid (not shown) such as brine is circulated within cooling system 10.

Of course, other types of cooling systems may be utilized. For example, cooling system 10 could be comprised simply of an air cooled heat exchanger, a water cooled heat exchanger or a gas cooled heat exchanger rather than employing a refrigeration unit and a liquid coolant. Those skilled in the art will also understand that the type of cooling system utilized is determinative of the systems open or closed characteristics. For example, unlike the closed-loop system of FIG. 1, an air cooled cooling system could be of the open-loop type. Furthermore, the cooling system may be disposed anywhere within the fuel supply system and still accomplish the results intended by the method and apparatus herein described. Fuel reservoir 14 need not be in direct series with cooling system 10. Additional devices, such as pumps and the like may be disposed in the fuel system as well. In any event, those skilled in the art will understand that such systems and devices are typically in fluid communication with one another such that the fuel is eventually delivered to the gas turbine.

In the preferred embodiment, liquid fuel (not shown) having a first temperature $T_1$ and contained in fuel reservoir 14 is passed through heat exchanger 18 before the fuel is injected into gas turbine 16. Heat exchanger 18 removes heat from the liquid fuel via the cooling fluid, such that upon exit from heat exchanger 18, the liquid fuel has a second temperature $T_2$ that is lower than first temperature $T_1$. Typically, the fuel will be characterized by a flash point temperature $T_F$. The amount of heat removed by heat exchanger 18 ensures that temperature $T_2$ remains below flash point temperature $T_F$, thus avoiding problems with phase change from the liquid state to gaseous state, as well as premature combustion upon injection into gas turbine engine 16. Furthermore, fuel passing through heat exchanger 18 in the gaseous state will condense back into a liquid state before passing into gas turbine engine 16.

The invention has been found to be desirable when used with fuels having specific gravities of less than 0.80 and most desirable when used with fuels having specific gravities of less than 0.72, i.e., light hydrocarbons. There is some overlap in the flash temperature of the light and heavy hydrocarbons, making the invention useful for both. It is well know that flash temperatures for paraffinic hydrocarbons are higher than the flash temperatures for naphthenic hydrocarbons, although viscosities and specific gravities may be the same. This is due to differences in the critical temperature of a particular hydrocarbon or hydrocarbon mixture (the highest temperature at which a gas can still be forced into a liquid) and the critical pressure of a particular hydrocarbon or hydrocarbon mixture (the minimum pressure required to form a liquid at the critical temperature). For example, the invention may be used with gas turbine engines that are fueled by naphtha (specific gravity=0.65 to 0.79), butane (specific gravity=0.584) or lighter hydrocarbons, but is not considered necessary when diesel fuel or jet fuel (specific gravity=0.80 to 0.85) are utilized.

In any event, the flash point temperature for light hydrocarbons is typically much lower than heavy hydrocarbons, such that light hydrocarbon fuel may be undesirable for use in standard gas turbine engines. However, by utilizing the cooling apparatus and method of the invention, the problems of low flash point temperatures, namely phase change and premature combustion, are avoided, permitting the use of the less expensive and more plentiful light hydrocarbons. Of course, those skilled in the art will understand that the critical temperature and pressure for a given fuel must be evaluated to determine if that particular fuel requires cooling under the relevant operating conditions for a particular gas turbine engine.

An advantage of the current invention is that it can be utilized with preexisting gas turbine engines without the need for expensive modifications to the turbine itself or the fuel reservoir. In fact, the system can simply be tapped into the preexisting fuel line between the turbine and the fuel reservoir. As such, the invention is especially desirable for use with preexisting gas turbine engines, especially when such installations are made in the field rather than back at a base location.

While certain features and embodiments of the invention have been described in detail herein, it will readily be understood that the invention encompasses all modifications and enhancements within the scope and spirit of the invention. In addition, it will be appreciated that references to standard equipment such as pumps, valves, sensors and the like have been omitted for purposes of clarity.

What is claimed is:

1. A method for supplying fuel to gas turbine engine, the method comprising the following steps:
   a. providing a fuel at first temperature;
   b. passing said fuel through a cooling system wherein said fuel is cooled to a second temperature lower than the first temperature and below flash point temperature of said fuel; and
   c. injecting said cooled fuel into a gas turbine engine.

2. The method of claim 1 wherein said fuel has a specific gravity of less than 0.08.

3. The method of claim 1 wherein the step of passing said fuel through a cooling system further comprises passing said fuel through a heat exchanger.

4. The method of claim 3, further comprising the step of circulating a cooling fluid through said heat exchanger.

5. The method of claim 3 wherein said exchanger is air cooled.

6. A method for supplying fuel to gas turbine engine, the method comprising the following steps:
   a. providing a fuel at first temperature;
   b. passing said fuel through a cooling system wherein said fuel is cooled to a second temperature lower than the first temperature;
   c. injecting said cooled fuel into a gas turbine engine;
   d. wherein the step of passing said fuel through a cooling system further comprises passing said fuel through a heat exchanger;
   e. circulating a cooling fluid through said heat exchanger;
   f. and further comprising circulating said cooling fluid through a refrigeration unit.

7. A gas turbine comprising:
   a. a compressor;
   b. a combustion chamber in fluid communication with said compressor;
   c. a turbine in fluid communication with said combustion chamber; and
   d. a fuel delivery system comprising:
      (1) a fuel reservoir for supplying light hydrocarbon fuel at ambient temperature; and
      (2) a cooling system in fluid communication with said fuel reservoir for cooling said fuel to below ambient temperature before said fuel is injected into the gas turbine engine, wherein said cooling system is between said fuel reservoir and said gas turbine.

8. A fuel delivery system for a gas turbine engine, said system comprising:
   a. a fuel reservoir for containing a fuel; and
   b. a cooling system in fluid communication with said fuel reservoir for cooling said fuel to below its flash point temperature before said fuel is injected into the gas turbine engine.

9. The fuel delivery system of claim 8 further comprising a cooling fluid in said cooling system.

10. A fuel delivery system for a gas turbine engine, said system comprising:
    a. a fuel reservoir for containing a fuel;
    b. a heat exchanger in fluid communication with said fuel reservoir for cooling said fuel before said fuel is injected into the gas turbine engine; and further comprising a cooling fluid containment reservoir in fluid communication with a refrigeration unit which is also in fluid communication with said heat exchanger, and a cooling fluid, wherein said cooling fluid is circulated between said heat exchanger, said refrigeration unit and said containment reservoir.

11. The fuel delivery system of claim 10 wherein said heat exchanger, said containment reservoir and said refrigeration unit are a closed-loop system.

12. The fuel delivery system of claim 10 wherein said heat exchanger, said containment reservoir and said refrigeration unit are an open-loop system.

13. The fuel delivery system of claim 9 wherein said cooling fluid is a gas.

14. The fuel delivery system of claim 9 wherein said cooling fluid is a liquid.

15. A fuel delivery system for a gas turbine engine, said system comprising:

a. a fuel reservoir for containing a fuel;

b. a heat exchanger in fluid communication with said fuel reservoir for cooling said fuel before said fuel is injected into the gas turbine engine; and c. a cooling fluid in said heat exchanger, wherein said cooling fluid is a brine.

16. The fuel delivery system of claim 14 wherein said liquid is water.

17. The fuel delivery system of claim 13 wherein said gas is air.

\* \* \* \* \*

UNITED STATES PATENT AND TRADEMARK OFFICE
CERTIFICATE OF CORRECTION

PATENT NO. : 6,014,855
DATED : January 18, 2000
INVENTOR(S) : Vince Page

It is certified that error appears in the above-identified patent and that said Letters Patent is hereby corrected as shown below:

On Col. 3, line 1, after "i.e.,", insert --as--.

On Col. 4, line 18, at the beginning, delete "associate" and insert --associated--.

On Col. 5, line 21, after "well", delete "know" and insert --known--.

On Col. 6, line 7, after "than" delete "0.08" and insert --0.80 --.

On Col. 6, lines 13, claim 5, before "exchanger", insert --heat--.

Signed and Sealed this

Seventh Day of November, 2000

Attest:

Q. TODD DICKINSON

*Attesting Officer*  *Director of Patents and Trademarks*